US010842183B2

(12) United States Patent
Rutkowski (10) Patent No.: US 10,842,183 B2
(45) Date of Patent: Nov. 24, 2020

(54) FORMING AND TRANSPORTING APPARATUS FOR CONVEYING AND FORMING A GROUP OF ROD-LIKE ARTICLES, AND FEEDING APPARATUS FOR FEEDING A GROUP OF ROD-LIKE ARTICLES

(71) Applicant: International Tobacco Machinery Poland Sp. z o. o., Radom (PL)

(72) Inventor: Artur Rutkowski, Padom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 0 days.

(21) Appl. No.: 15/929,204

(22) Filed: Jan. 15, 2020

(65) Prior Publication Data

US 2020/0245673 A1    Aug. 6, 2020

(30) Foreign Application Priority Data

Jan. 31, 2019   (EP) ..................................... 19154649

(51) Int. Cl.
*A24C 5/35*   (2006.01)
*A24C 5/32*   (2006.01)
*B65G 47/84*  (2006.01)

(52) U.S. Cl.
CPC ................ *A24C 5/327* (2013.01); *A24C 5/35* (2013.01); *B65G 47/84* (2013.01)

(58) Field of Classification Search
CPC .......... A24C 5/327; A24C 5/35; B65G 47/84; B65G 47/252; B65G 47/248; B65G 57/081; B65G 57/08; B65G 47/244; B65G 57/32; B65G 57/18; B65G 57/02; B65B 19/08; B65B 19/10; B65B 19/04; B65B 19/02; B65B 19/00; B65B 19/34; B65B 35/50

See application file for complete search history.

(56) References Cited

U.S. PATENT DOCUMENTS 2,701,938 A * 2/1955 Murray .................. B65B 21/24
                                                    53/398
2,929,489 A    3/1960 Parrish
(Continued)

FOREIGN PATENT DOCUMENTS

DE       29605419 U1    5/1996
EP       0627176 A1    12/1994
(Continued)

*Primary Examiner* — Gregory W Adams
(74) *Attorney, Agent, or Firm* — Oppedahl Patent Law Firm LLC (57) ABSTRACT

The object of the invention is a forming and transporting apparatus for conveying rod-like articles and for forming groups of the rod-like articles of the tobacco industry, comprising transport units, whereas a transport unit comprises a transport carriage adapted to move along a path, and a transport tray provided with a number of transport grooves adapted to hold the rod-like articles, whereas the tray is fastened to the transport carriage, whereas the transport tray is divided into two transport sections which are adapted to change the reciprocal position between an open configuration in which the transport grooves are situated substantially in one plane and a closed configuration in which the transport grooves are situated in two planes being substantially parallel to each other.

7 Claims, 10 Drawing Sheets

(56) References Cited

U.S. PATENT DOCUMENTS

| | | | |
|---|---|---|---|
| 2,988,199 A | | 6/1961 | Pinkham |
| 3,589,097 A | | 6/1971 | Gianese |
| 3,884,013 A | * | 5/1975 | Solomon .............. B65B 5/06 53/467 |
| 4,487,540 A | * | 12/1984 | Buchheit ............ B65G 57/183 414/788.2 |
| 4,860,880 A | | 8/1989 | Hinchcliffe |
| 4,931,131 A | * | 6/1990 | Thompson ........... B65B 35/243 156/556 |
| 5,174,089 A | * | 12/1992 | Poloni ................ B65G 57/183 414/788.3 |
| 7,165,668 B2 | | 1/2007 | Dombek |
| 7,322,171 B2 | * | 1/2008 | Bonnain ............... B65B 5/024 53/209 |
| 7,695,240 B2 | * | 4/2010 | Ghosh ................ B65G 57/183 414/802 |
| 9,540,141 B2 | * | 1/2017 | Kurz ................... B65D 5/0085 |
| 2005/0077148 A1 | | 4/2005 | Dombek |
| 2008/0077148 A1 | | 3/2008 | Notheis |
| 2012/0090954 A1 | | 4/2012 | Humpfer |

FOREIGN PATENT DOCUMENTS

| | | |
|---|---|---|
| EP | 1020357 A1 | 7/2000 |
| GB | 1015562 A | 1/1966 |
| GB | 1519293 A | 7/1978 |
| WO | WO03051718 A1 | 6/2003 |

\* cited by examiner

FORMING AND TRANSPORTING APPARATUS FOR CONVEYING AND FORMING A GROUP OF ROD-LIKE ARTICLES, AND FEEDING APPARATUS FOR FEEDING A GROUP OF ROD-LIKE ARTICLES

The object of the invention is a forming and transporting apparatus for conveying and forming a group of rod-like articles, and a feeding apparatus for feeding a group of rod-like articles.

The invention belongs to the tobacco industry solutions, in particular to the field of solutions used in packing machines for finished tobacco products.

BACKGROUND

From the document US 2012/0090954 an apparatus for the handling of objects is known. This apparatus comprises a handling apparatus which receives objects from a feeding area and which supplies the objects by means of a transferring apparatus to at least one workstation. The handling apparatus, respectively, simultaneously receives a specific number of objects by means of an object carrier in such a way that the transferring apparatus has multiple carrying elements for multiple objects respectively held by the handling apparatus. Furthermore, the sequence of movements of each carrying element on the transferring apparatus is individually controlled so that the handling apparatus removes respectively multiple objects from the respective carrying element after passing through at least one workstation.

From the document U.S. Pat. No. 7,165,668 an apparatus for transferring rod-like articles from a longitudinal conveyor is known, whereas such apparatus transfers the articles onto a transverse conveyor. Furthermore, the apparatus comprises a conveyor which receives the articles from the longitudinal conveyor and supplies the articles to the transverse conveyor, whereas the conveyor comprises at least a first conveying element and a separate second transporting element which are configured for being functionally combined with each other. Additionally, the second conveying element is structured and positioned so that it rotates the articles by a specific angle. Furthermore, the second conveying element is structured and positioned so as to reduce the transport speed of the articles.

From the document WO2003051718 a cigarette packing machine, comprising an endless drying conveyor having at least one substantially spiral part, an input station and an output station, is known. This conveyor moves endlessly along a given path in a given direction of movement in order to feed successive cigarette batches between the said input and output stations. The apparatus is characterised in that the said drying conveyor comprises a sequence of coils out of which the first said coil extends in the said direction of movement from the said input station and is connected, at the input station, to the last-mentioned coil running through the said output station. From the document EP1020357 a method for forming groups of rod-like articles with a determined orientation of the rod-like articles in the group is known. The rod-like articles are supplied through multiple channels, and layers of the three-layer group of rod-like articles are placed into the pockets of an endless pocket conveyor, and the groups of rod-like articles are transferred for packaging.

Apparatuses and methods for rotating oppositely oriented rod-like articles are known from the prior art.

From the document U.S. Pat. No. 2,988,199 an apparatus for rotating oppositely oriented rod-like articles with the use of a double-sided V-belt is known. The V-belt is provided with wedges adapted to receive the rod-like articles from a drum feeder, secured against the possibility of rod-like article falling out of the wedge. The rod-like articles, individually placed in the wedges, are rotated in the axis corresponding to the direction of movement of the rod-like articles, due to a twist of the belt on the transmission rollers. The rotated rod-like articles are released individually from the wedges onto a belt feeder which forms them into an oriented flow of the rod-like articles.

From the document U.S. Pat. No. 2,929,489 an apparatus for rotating oppositely oriented cut rod-like articles is known. In the rod-like article cutting process, two flows with opposite orientations are obtained. In order to unify the orientation, one of the belt conveyors is provided with a crossed transfer belt which enables the rod-like articles arranged one after another to rotate by 180 degrees in the axis corresponding to the direction of movement of the rod-like articles, as a result of which a common orientation for both parallel flows is obtained. A similar solution was shown in the document GB1015562, the difference being that in place of the transfer belt a small belt consisting of an inner element, e.g. a steel cable covered on the outside with a soft material e.g. a rubber sponge ensuring an appropriate adhesion of the rod-like articles and preventing their damage, was used.

From the document GB1519293 an apparatus for rotating oppositely oriented rod-like articles is known. The apparatus comprises two independent belt conveyors on which oppositely oriented rod-like articles arranged one after another are situated. At least one of the belt conveyors is adapted to changing the orientation of the rod-like articles by 90 degrees in the axis corresponding to the direction of movement of the rod-like articles, as a result of which a common orientation for both flows is obtained. The correctly oriented rod-like articles from each of the belt conveyors merge and, at a further stage, form a mass flow.

From the document U.S. Pat. No. 4,860,880 an apparatus for rotating a multi-layer flow of rod-like articles is known. The apparatus comprises belt conveyors on which oppositely oriented rod-like articles are situated. By controlling the conveyor travel speed, multi-layer flows of rod-like articles with opposite orientations are created, whereas such flows are rotated, by means of appropriately twisted belts, by the angle of 90 degrees in the axis corresponding to the direction of movement of the rod-like articles. The correctly oriented flows obtained in this way merge and form a mass flow. During a further transport, the mass flow may be rotated again to set the desired orientation.

SUMMARY OF THE INVENTION

The object of the invention is a forming and transporting apparatus for conveying rod-like articles and for forming a group of the rod-like articles of the tobacco industry, comprising transport units, whereas a transport unit comprises a transport carriage adapted to move along a path, and a transport tray provided with a number of transport grooves adapted to hold the rod-like articles, whereas such tray is fastened to the transport carriage, whereas the transport carriage is divided into two transport sections which are adapted to change their reciprocal position between an open configuration in which the transport grooves are situated substantially in one plane and a closed configuration in which the transport grooves are situated in two planes being substantially parallel to each other, whereas the transport sections are rotatably connected with each other on the axis of rotation corresponding to the direction of movement of the transport carriage, characterised in that the first transport section is fastened to the transport carriage, and the second transport section is provided with a steering element, the forming and transporting apparatus is provided with a forming unit comprising a closing cam situated next to the path, the closing cam having a raceway adapted to guide the steering element in such a way that when moving the transport unit through the forming unit the second transport section makes a rotation relative to the first transport section in order to change the configuration of the transport sections from the open configuration to the closed configuration.

The apparatus is further characterised in that the cam has a cylindrical form.

The apparatus is further characterised in that the steering element is a rotating roller.

The apparatus is further characterised in that the body of the second tray is provided with at least one vacuum channel being in fluid connection with vacuum openings in the transport grooves of the second transport section, whereas the vacuum channel is directed towards the cylindrical surface provided with openings which supply the vacuum during the movement of the transport unit through the forming unit.

The apparatus is further characterised in that the cylindrical surface is a stationary surface.

The apparatus is further characterised by being provided with an opening unit comprising an opening cam situated next to the path, the opening cam having a channel adapted to guide the steering element in such a way that when moving the transport unit through the opening unit the second transport section makes a rotation relative to the first transport section in order to change the configuration of the transport sections from the closed configuration to the open configuration.

The apparatus is further characterised in that the transport units are adapted to move along a path independently of one another.

The object of the invention is also a feeding apparatus for feeding a group of rod-like articles, comprising at least one feeding unit for feeding rod-like articles provided with a drum conveyor; at least one forming and transporting apparatus for receiving the rod-like articles from the drum conveyor, conveying the rod-like articles and forming groups of rod-like articles; a conveyor of groups of rod-like articles for receiving the groups of rod-like articles from the forming and transporting apparatus and feeding the groups to a receiving apparatus; a transferring unit for transferring the groups of the rod-like articles from the transport unit to the pockets of the conveyor of the groups of rod-like articles, characterised by being provided with the forming and transport apparatus.

The use of transport units provided with transport means rotated by means of a cam ensures an increase of the efficiency of production lines. The applied solution allows building a production line with a compact structure. The electromagnetically driven transport carriages as well as rotating and closing sections of the transport trays allow achieving an efficiency which is unachievable for transport systems based on conventional endless chains.

The forming apparatus according to the invention allows controlling the quality of the rod-like articles with regard to the front surfaces of both ends as well as the components of the articles.

Furthermore, the forming means according to the invention eliminate the need of inserting the tobacco industry articles into a conventional hopper used in conventional packing machines, which results in a reduction of the number of damaged articles in packets and a reduction of the number of rejected packets with tobacco products.

DESCRIPTION OF THE DRAWING

The object of the invention was discussed in detail on the basis of an embodiment illustrated in a drawing in which.

DETAILED DESCRIPTION

Figure 1:
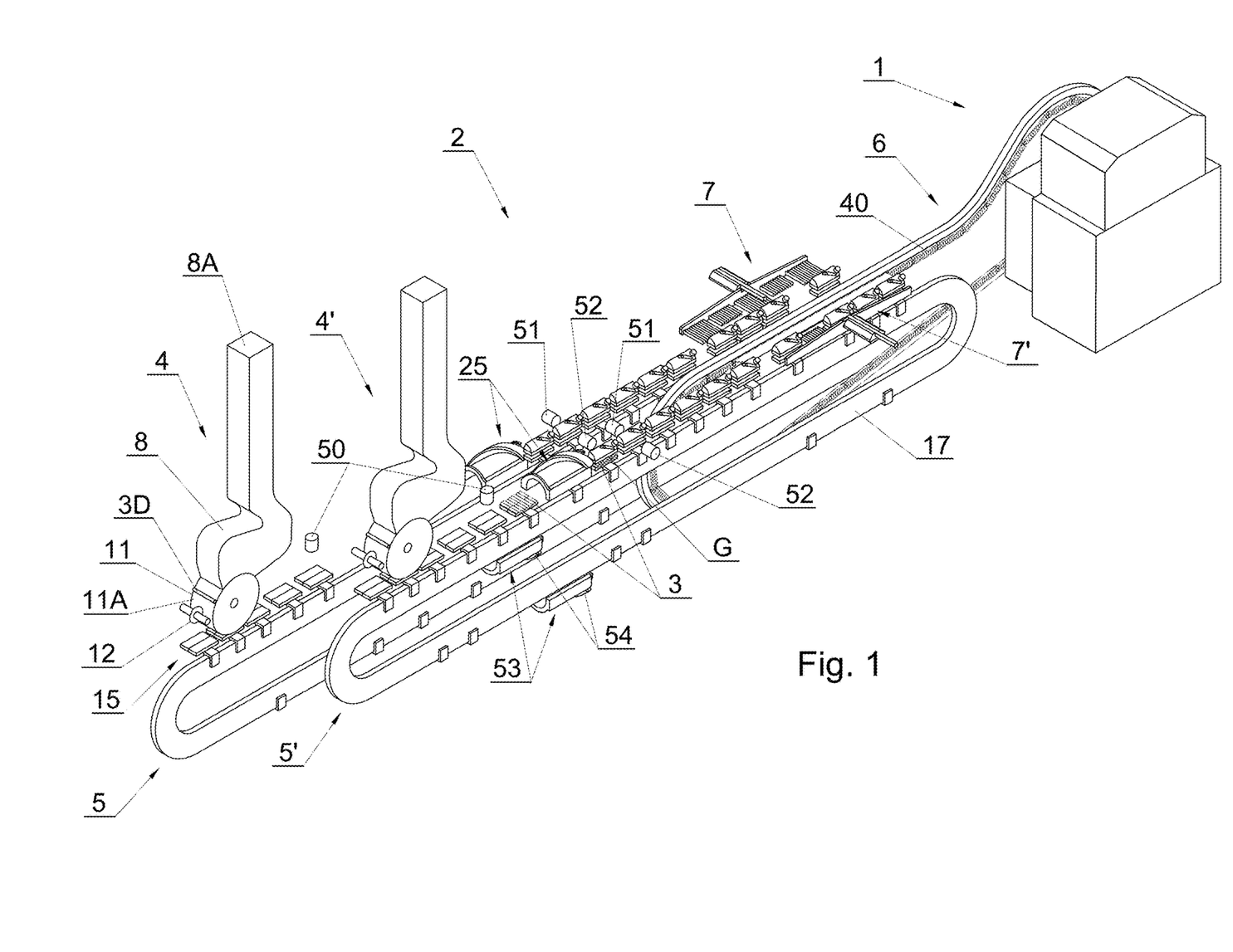
FIG. 1 shows a fragment of a production line in a perspective view.

FIG. 1 shows a fragment of a production line comprising a packing apparatus 1 for packing groups of rod-like articles 3 and a feeding apparatus 2 adapted to feed the groups G of rod-like articles 3. The feeding apparatus 2 is provided with two feeding units 4, 4' for feeding rod-like articles 3D (the rod-like article 3D has the length of two rod-like articles 3), two forming and transporting apparatuses 5, 5' for forming and conveying the groups G of rod-like articles 3 and a conveyor 6 of the groups G of rod-like articles 3 which supplies the groups G of rod-like articles 3 to the packing apparatus 1, whereas for transferring the groups G of rod-like articles 3 from the forming and transporting apparatus 5, 5' to the conveyor 6 of the groups G a transferring unit 7, 7' is used. The further description concerns such a line as shown in FIG. 1 as well as a production line provided with only one feeding unit 4, one forming and transporting apparatus 5, the conveyor 6 of the groups G of rod-like articles 3 and the packing apparatus 1.

The feeding unit 4 is provided with a hopper 8 to which a channel 8A supplying the rod-like articles 3D is attached to the hopper 8 from above or from the side. The channel 8A may be situated vertically or slantwise to the vertical direction. The rod-like articles 3D fed to the hopper 8 have a double length in relation to the rod-like articles 3 which are transported by the forming and transporting apparatus 5, 5' from which the formed groups G are fed to the packing apparatus 1. The hopper 8 is provided with walls 9, 10 (FIG. 2), underneath the hopper 8 there is situated a grooved drum conveyor 11 for conveying the rod-like articles 3D, the circumferential surface 11A of the drum conveyor 11 constitutes the bottom of the hopper 8 (for the sake of simplification, in FIG. 1 the circumferential surface 11A is shown as smooth). The rod-like articles 3D are transported in grooves 14. Next to the drum conveyor 11, there is situated a circular knife 12 adapted to cut the rod-like article 3D transported on the drum 11 into two rod-like articles 3. For example, in FIG. 2 the rod-like article 3D was shown as a cigarette of a double length which is cut into two individual cigarettes. The rod-like article 3D may be any other article, for example a multi-segment filter rod of a double length.

Figure 2:
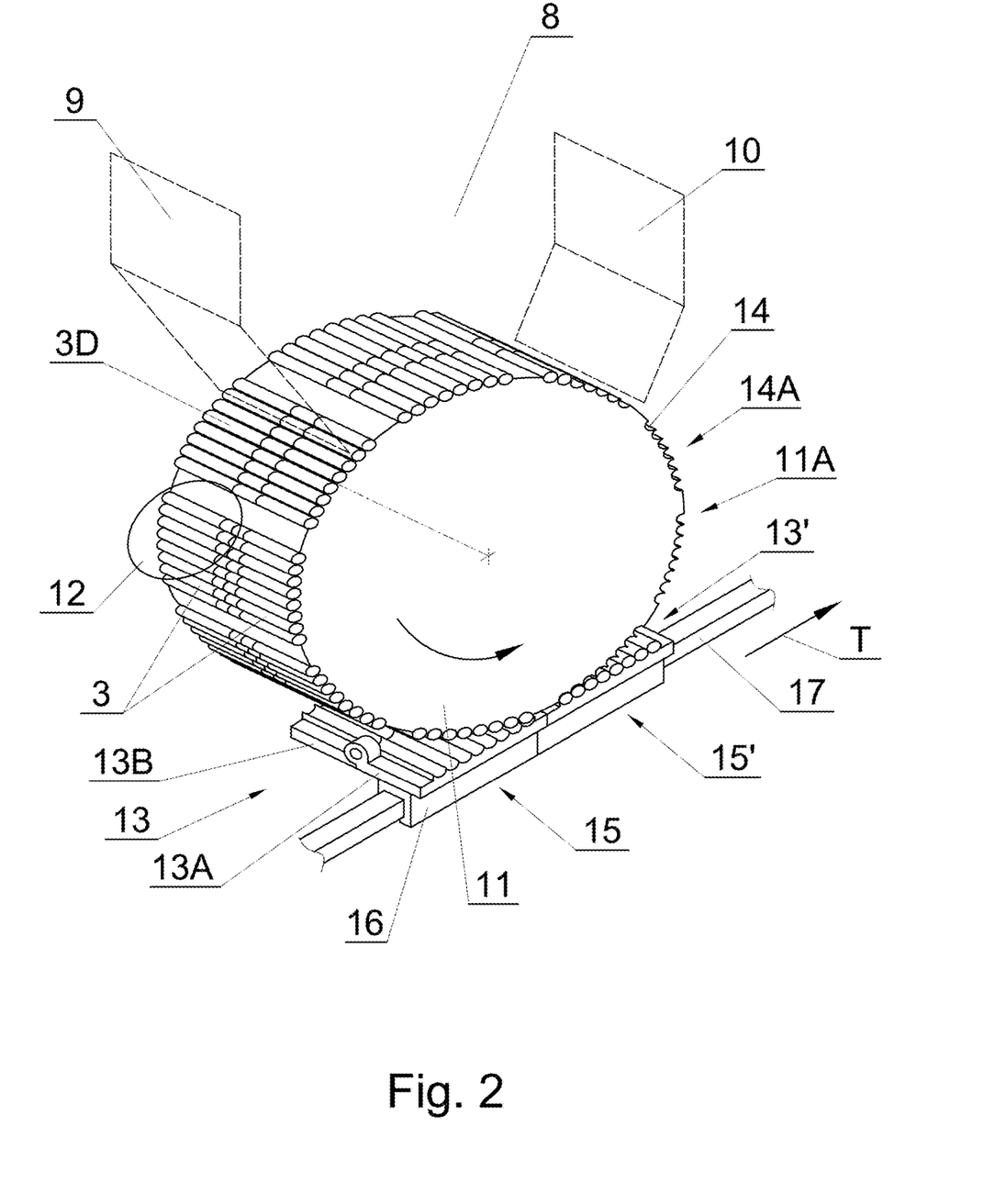
FIG. 2 shows, in simplified terms, a drum conveyor and a transport unit in a perspective view.
Figure 3:
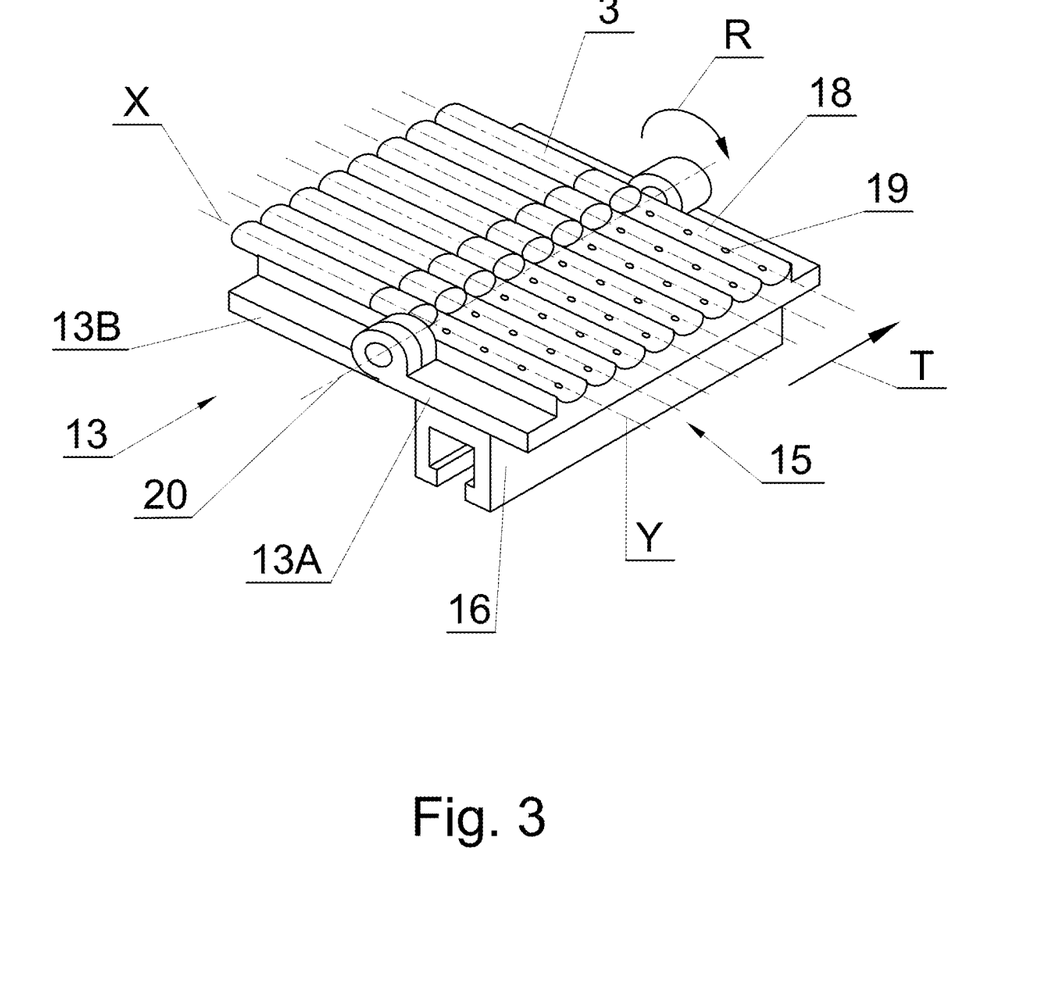
FIG. 3 shows, in simplified terms, the transport unit in the open configuration.

The drum conveyor 11 is fed from the hopper 8, whereas it is possible to feed the drum conveyor 11 also another way, for example from another drum conveyor. On the drum conveyor 11, the rod-like articles 3 formed by cutting the rod-like article 3D are further transported in the grooves 14 from which the rod-like articles 3 are transferred onto the trays 13 of a transport unit 15 of a forming and transporting apparatus 5. The grooves 14 are grouped in sections 14A on the circumferential surface 11A of the drum conveyor 11, whereas the number of the grooves 14 in the section 14A is adapted to the number of grooves in the tray 13. The tray 13 consists of two parts and is composed of a first transport section 13A permanently attached to a transport carriage 16 of the transport unit 15 and a second transport section 13B rotatably attached to the first transport section 13A. The arrows show the direction of rotation of the drum conveyor 11 and the direction of movement of the transport units 15 along the path 17. The transport sections 13A, 13B, the transport carriage 16 and the path 17 were shown in simplified terms, in other drawings they may be shown in another way. FIG. 2 shows two transport units 15, 15', whereas the tray 13' of the transport unit 15' has received the rod-like articles 3, whereas the transfer of the rod-like articles 3 onto the tray 13 of the transport unit 15 is just beginning. The forming and transporting apparatus 5 may be provided with multiple transport units 15 moving along the path 17 independently of one another. In FIG. 3, the transport sections 13A, 13B are in the open configuration, they are situated so that the grooves 18 of both sections 13A, 13B are in one plane, whereas the groove 18 has a diameter adapted to the diameter of the rod-like article 3, and the axis X of the rod-like article 3 substantially overlaps the axis Y of the groove 18, whereas the axes Y of the grooves 18 are situated in one plane k. The second transport section 13B is adapted to rotate around the axis 20 as shown by the arrow R. After the rotation of the second transport section 13B by 180°, the transport sections 13A, 13B are in the closed configuration, the plane of the grooves of the section 13B will be situated parallel to the plane of the grooves of the section 13A. The groove 18 is provided with openings 19 supplying the vacuum necessary to hold the rod-like article 3 in the groove 18. FIG. 3 shows the first transport section 13A unfilled, while all grooves 18 of the second transport section 13B are filled with the rod-like articles 3. The openings 19 supplying the vacuum may be provided in both the first transport section 13A and the second transport section 13B.

Figure 4:
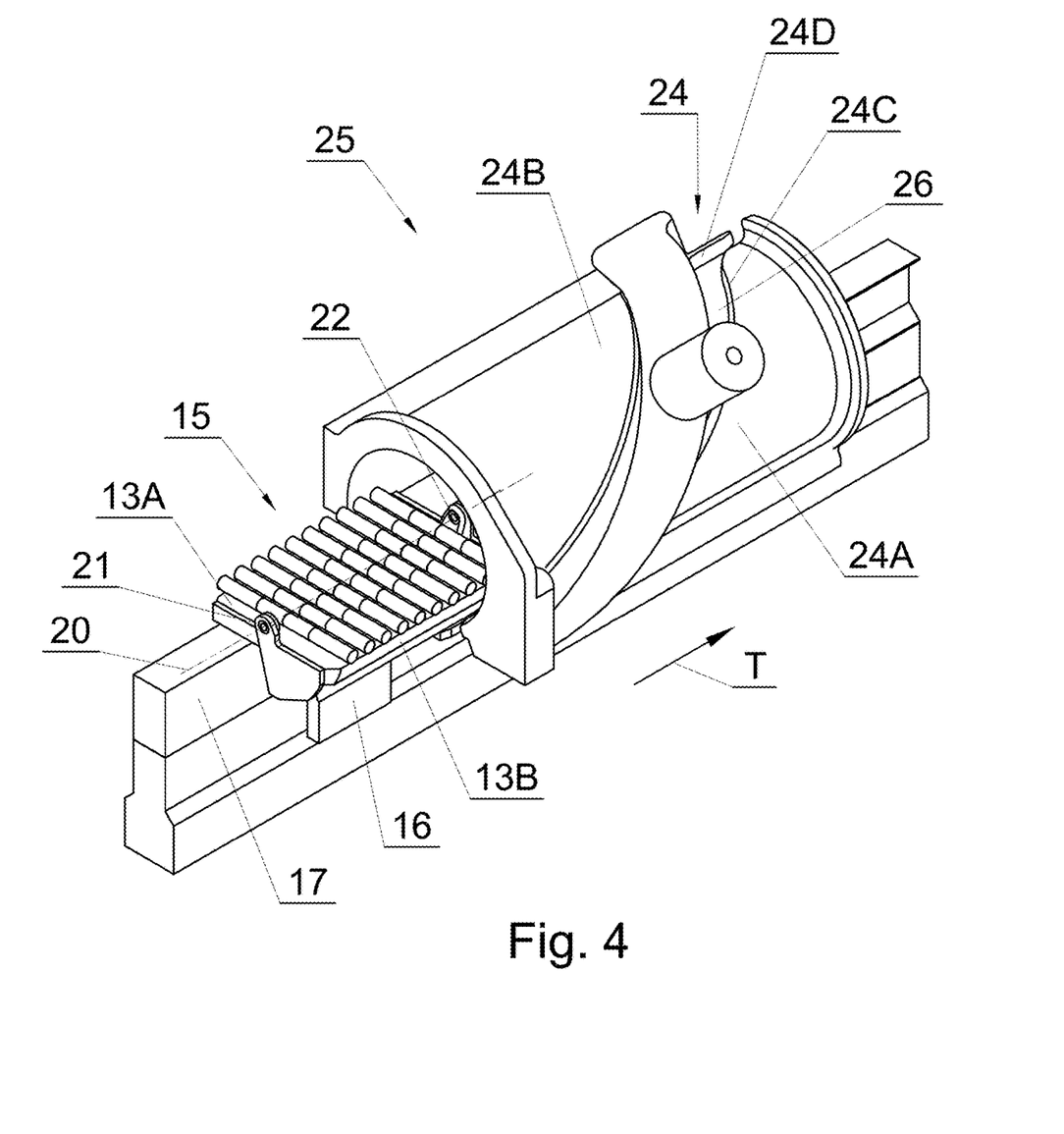
FIG. 4 shows a forming unit and a transport unit in the open configuration in a perspective view.
Figure 5:
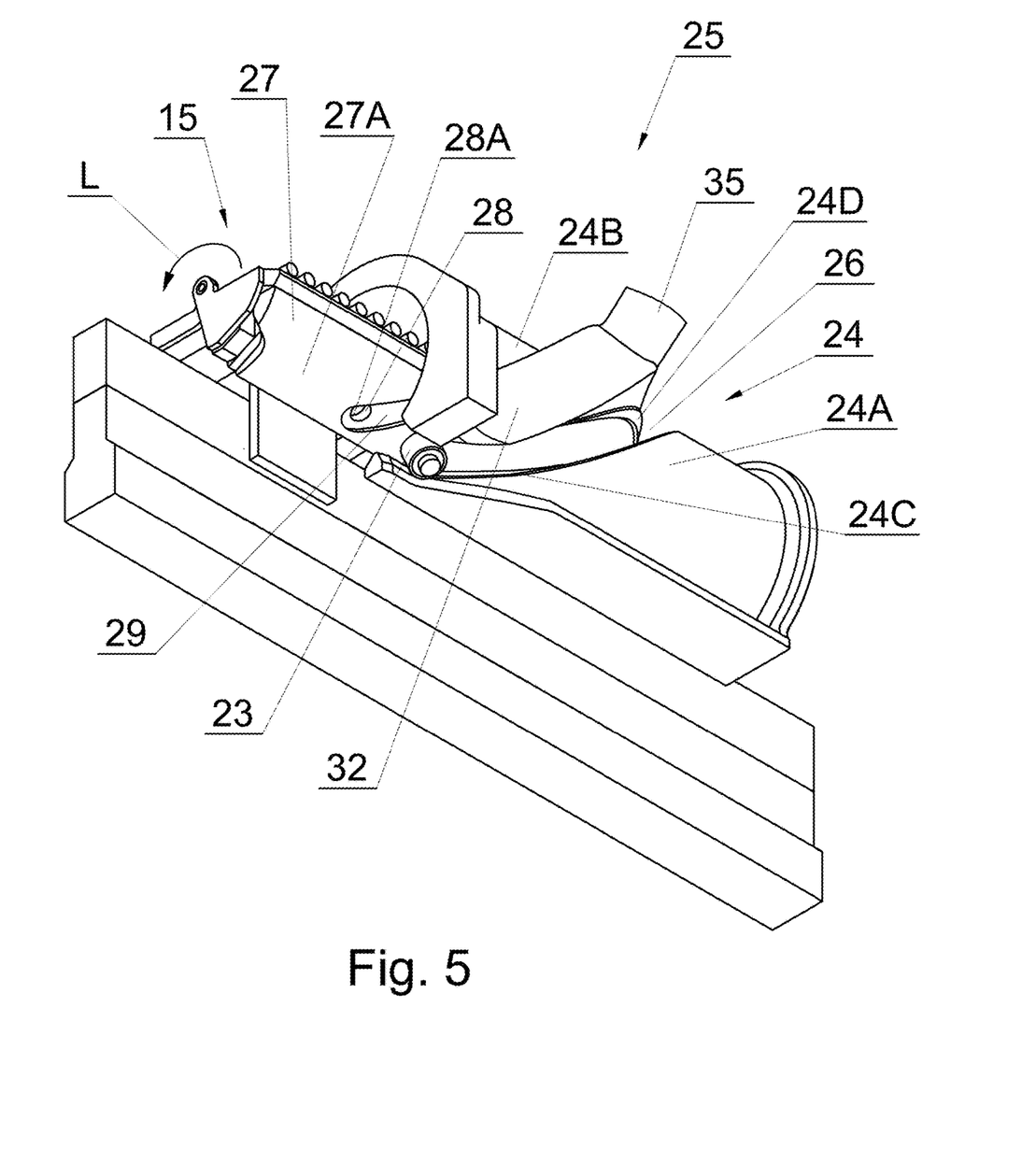
FIG. 5 shows the forming unit and the transport unit of FIG. 3 in the open configuration in a perspective view from below.
Figure 6:
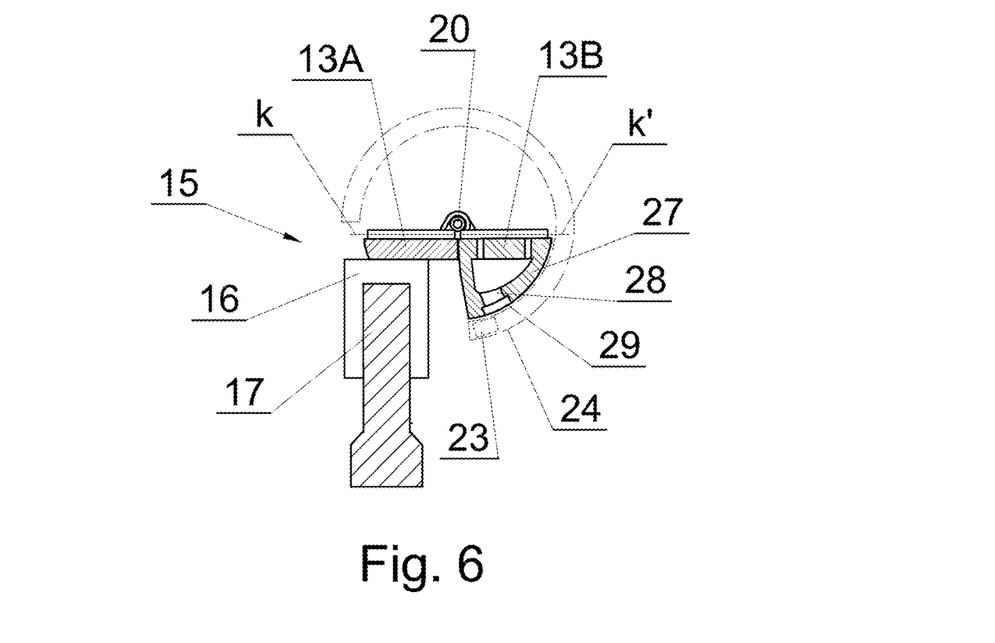
FIG. 6 shows the transport unit in the open configuration in the direction of movement of such unit.
Figure 7:
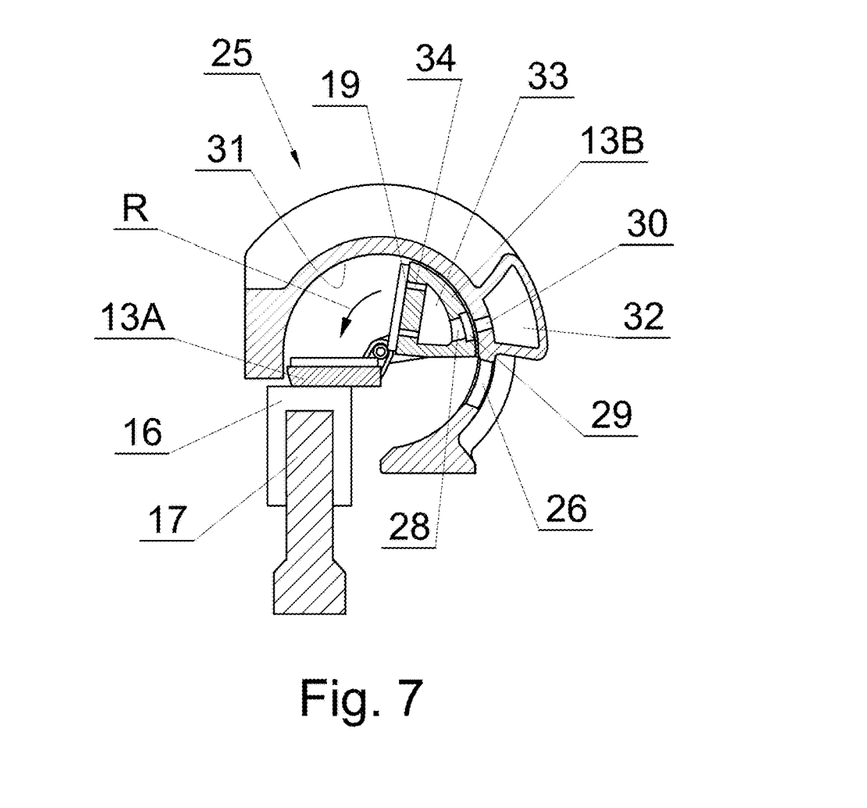
FIG. 7 shows the transport unit during a change of configuration from open to closed in the direction of movement of such unit.

In FIG. 3, looking in the direction of movement T of the transport carriage, the second transport section 13B is situated on the left side and is adapted to make a clockwise rotation R, and the axis of rotation 20 corresponds to the direction of movement T. It is possible to arrange the transport sections reversely, i.e. to situate the second transport section 13B on the right side and to make an anticlockwise rotation. FIG. 4 shows an embodiment of the transport unit 15 in the open configuration, just before changing to the closed configuration, moving in the direction T which is parallel to the path 17, whereas the second transport section 13B is on the right side when looking in the direction of movement T. As shown in FIG. 1, the path 17 is shaped as endless, i.e. the transport units 15 move on a closed path. The transport sections 13A, 13B of the transport unit 15 are adapted to a change of configuration of their reciprocal position during the shift of the transport unit 15 by the forming unit 25. The first section 13A and the second section 13B are rotatably connected on the axis 20 by means of pivots 21, 22. The second transport section 13B is provided with a steering element 23, for example it may be a rotating roller (the steering element 23 is visible in FIG. 5). The steering element 23 is adapted to work with a closing cam 24 of the forming unit 25. The closing cam 24 is designed in such a way that the raceway extends over a cylindrical surface. During the movement of the transport unit 15 in the open configuration, the steering element 23 comes into contact with the raceway 24C of the part 24A of the closing cam 24 and with the raceway 24D of the part 24B, which forces the second transport section 13B to make a rotational movement relative to the first transport section 13A in the direction marked with the arrow L. The steering element 23 moves in the channel 26 formed by the raceways 24C and 24D of the parts 24A and 24B, respectively, of the closing cam 24 as shown in FIG. 5, whereas the movement of the steering element 23 only on the raceway 24C is sufficient to force the rotation of the second transport section 13B. During the shift of the transport unit 15 by the forming unit 25, the transport section 13B rotates in an accelerated movement so that the force of inertia acting on the rod-like articles 3 presses them against the grooves 18 in order to prevent the rod-like articles 3 from falling out of the grooves 18 during the rotation of the second transport section 13B. In addition, the rod-like articles 3 may be held by the vacuum supplied to the openings 19 through the channels in the body 27 of the transport section 13B. FIG. 6 shows the transport sections 13A, 13B before inserting into the forming unit 25, i.e. before beginning the rotational movement of the second transport section 13B. The closing cam 24 and the steering element 23 are shown diagrammatically with a broken line. FIG. 7 shows transport sections 13A and 13B inside the forming unit 25 during the rotation of the second transport section 13B. As shown in FIG. 5, the inlet opening 28A of the channel 28 for the vacuum is situated in a lengthwise caving 29 in the cylindrical outer surface 27A of the body 27. During the movement of the transport unit 15 during the rotational movement of the transport section 13B, the caving 29 together with the outlet opening 28A of the channel 28 directed towards the cylindrical surface 31 are moved before the openings 30 on the cylindrical surface 31 (FIG. 7) which come to the vacuum channel 32. The vacuum channel 32 is situated on the closing cam 24 and runs substantially parallel to the channel 26 in which the steering element 23 is moving, and on the cylindrical surface 31 there are situated several openings 30 which connect the vacuum channel 32 with the cylindrical surface 31 and through which the vacuum is supplied to the caving 29, and through the channel 28, the chamber 33 and the channels 34 to the openings 19. At the vacuum channel 32 there is situated an inlet 35 to which the vacuum is supplied. The shape of the vacuum channel 32 and the arrangement of the openings 30 corresponding to the course of the channel 26, thus to the path of movement of the channel 28, ensure that the transport section 13B is continuously supplied with the vacuum when making a rotation and shifting the transport unit 15 by the forming unit 25. The vacuum channel 32 having the cylindrical surface 31 is fastened to the stationary closing cam 24. The vacuum channel 32 may be fastened as stationary independently of the closing cam 24.

Figure 8:
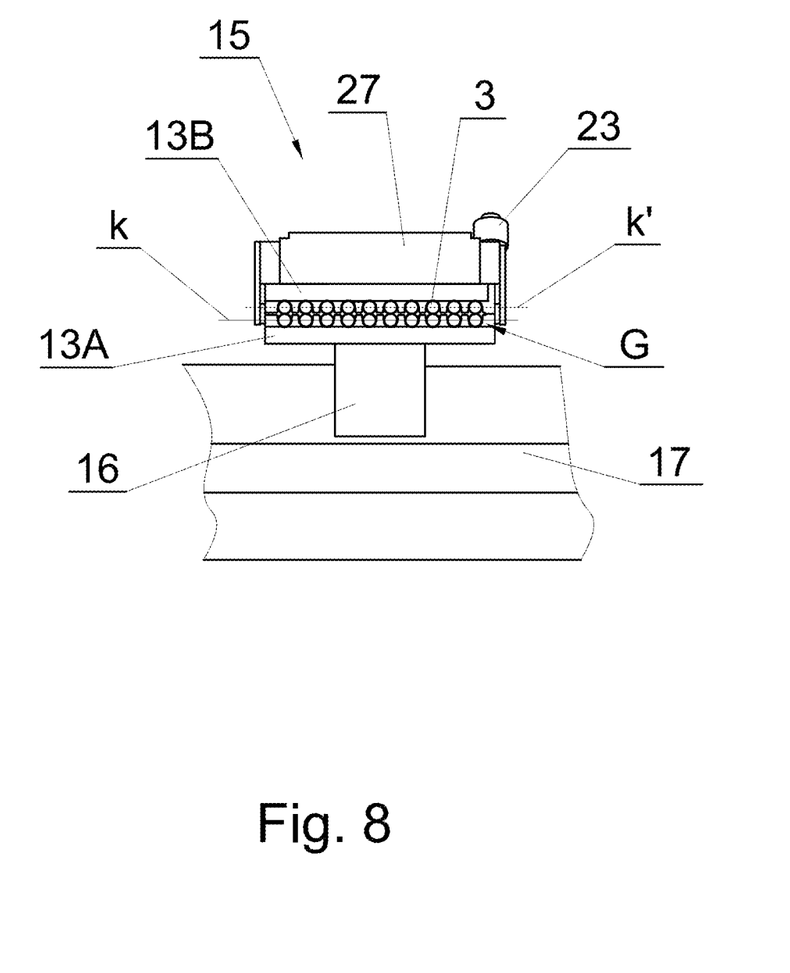
FIG. 8 shows the transport unit in the closed configuration in a side view.

FIG. 8 shows the transport unit 15 after the second section 13B has made a rotation by 180° after passing through the forming unit 25, the rod-like articles 3 transported in the grooves 18 of the transport sections 13A and 13B are formed in the group G which comprises two layers of the rod-like articles 3. In the open configuration, the movable transport sections 13A, 13B are situated next to each other (FIG. 6) so that the planes k, k' in which lie the axes of the grooves of both transport sections 13A, 13B overlap. In the closed configuration, the planes k, k' of both transport sections 13A, 13B are situated parallel to each other at a distance equal to about one diameter of the rod-like article 3. FIG. 1 shows one transport section 15 filled with the rod-like articles 3 and situated before the forming unit 25, and one transport unit 15 in which the group G of the rod-like articles 3 is situated behind the forming unit 25.

The transport carriages 16 of the forming and transporting apparatus 5 are driven by means of an electric or magnetic drive mechanism which enables the transport units 15 to move independently of one another with different speeds. For this purpose, the Beckhoff's XTS drive may be used. Due to the fact that the transport carriages 16 move independently of one another, it is possible to situate the transport carriages 16 as shown in FIG. 2, i.e. so that the transport trays 13, 13' are adjacent to one another and it is possible to transfer the rod-like articles 3 from the drum conveyor 11 to the grooves 18 continuously, i.e. without stopping the drum conveyor 11.

Figure 9:
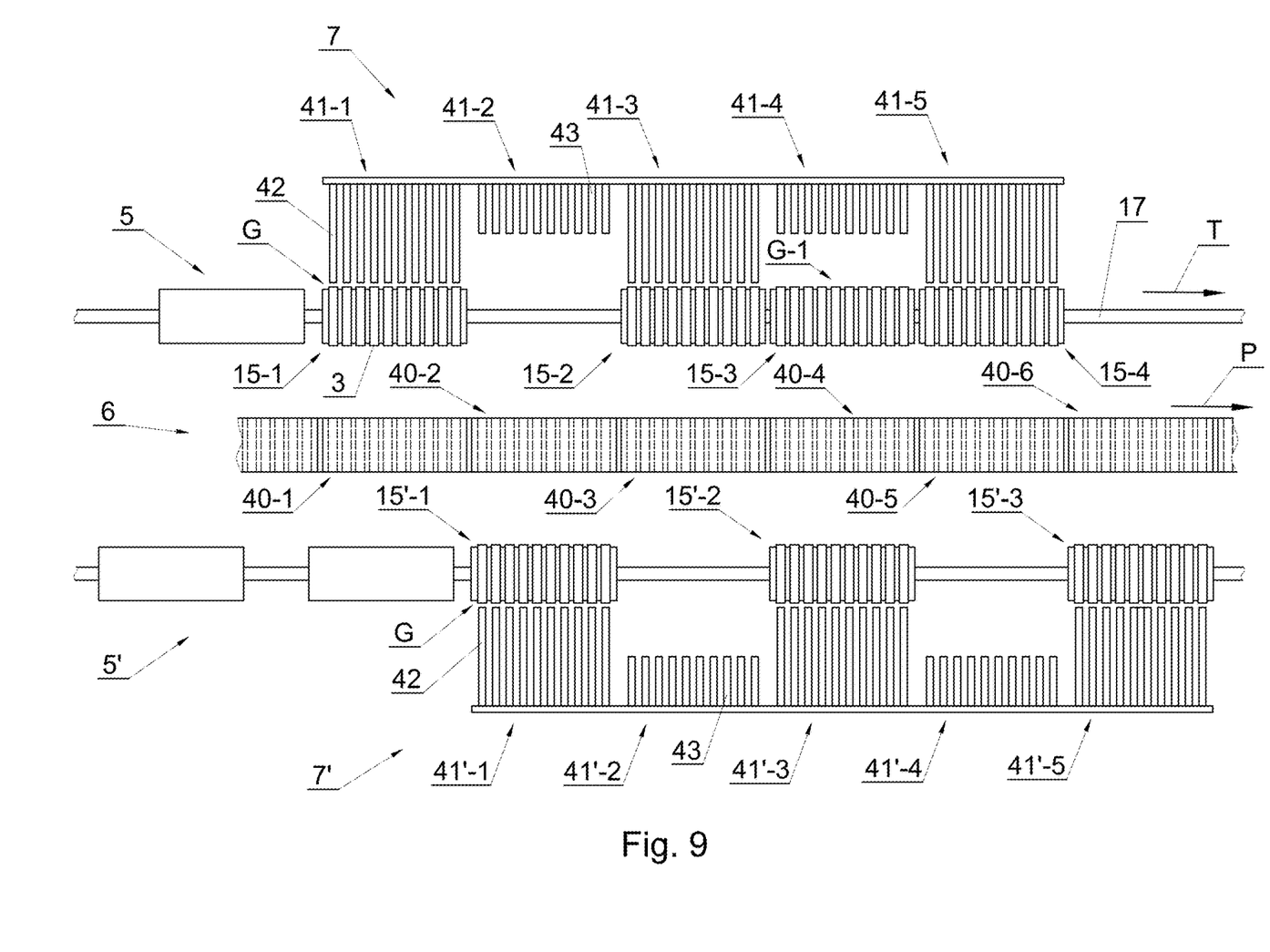
FIG. 9 shows fragments of two forming and transporting apparatuses, a fragment of a conveyor of groups of rod-like articles and two transferring units before transferring the groups of rod-like articles.
Figure 10:
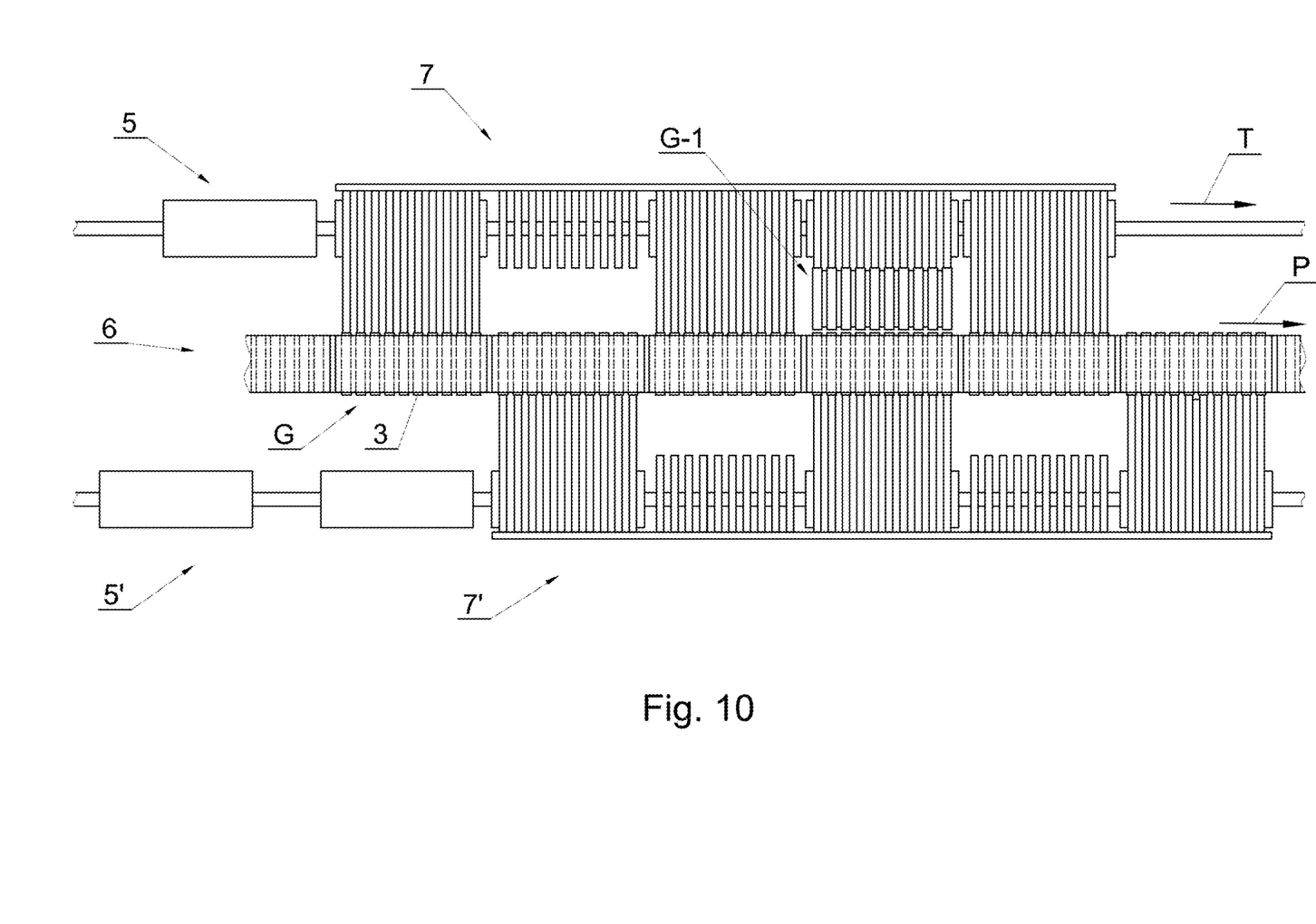
FIG. 10 shows fragments of two forming and transporting apparatuses, a fragment of the conveyor of groups of rod-like articles and two transferring units after transferring the groups of rod-like articles, FIG. 11 diagrammatically shows a packing apparatus and a fragment of the conveyor of the groups of rod-like articles.

After passing through the forming unit 25, the transport unit 15 is conveyed to the area in which the group G of the rod-like articles 3 may be transferred to the pockets 40 of the conveyor 6 of the groups of rod-like articles. The pockets 40 are pivotally connected with one another like chain links. Successive transport units 15 carrying the groups G stand one after another as shown in FIG. 1 on both sides of the conveyor 6. Three transport units 15 of the transporting and forming apparatus 5 and three transport units 15' of the transporting and forming apparatus 5' shown in FIG. 9 were stopped so that the groups G of the rod-like articles 3 held in these units may be transferred to six pockets 40 of the conveyor 6, whereas the transfer takes place in a direction perpendicular to the direction of movement T of the transport units 15 and simultaneously in a direction perpendicular to the direction of movement P of the pockets 40. The transport unit 15-1 is situated directly opposite the pocket 40-1, the transport unit 15-2 directly opposite the pocket 40-3, the transport unit 15-4 directly opposite the pocket 40-5. The group G in the transport unit 15-1 will be transferred to the pocket 40-1 by means of a pushing unit 41-1. The group G in the transport unit 15-2 will be transferred to the pocket 40-3 by means of the pushing unit 41-3. The group G in the transport unit 15-4 will be transferred to the pocket 40-5 by means of the pushing unit 41-5. In the transport unit 15-3, there is the group G containing defective rod-like articles 3. The group G will be pushed out of the transport unit 15-3 by means of the pushing unit 41-4, whereas an individual pusher 43 of the pushing unit 41-4 and 41-2 is shorter than an individual pusher 42 of the pushing unit 41-1, 41-3, 41-5, and the group G–1 pushed out of the transport unit 15-3 is not placed into the pocket 40-4. The transport unit 15'-1 is situated directly opposite the pocket 40-2, the transport unit 15'-2 directly opposite the pocket 40-4, the transport unit 15'-3 directly opposite the pocket 40-6. The group G in the transport unit 15'-1 will be transferred to the pocket 40-2 by means of the pushing unit 41'-1. The group G in the transport unit 15'-2 will be transferred to the pocket 40-4 by means of the pushing unit 41'-3. The group G in the transport unit 15'-3 will be transferred to the pocket 40-6 by means of the pushing unit 41'-5. After positioning the transport units 15, 15' carrying the groups G and after stopping the conveyor 6 of the groups G so that the transport units 15, 15' are situated directly opposite the empty pockets 40 of the conveyor 6, the transferring unit 7 and 7' is activated. The transferring unit 7 transfers the groups G from the forming and transporting apparatus 5, and the transferring unit 7' transfers the groups G from the forming and transporting apparatus 5'. FIG. 10 shows the transferring units 7, 7' after conveying six groups G to the pockets 40 of the conveyor 6, while the group G–1 containing defective rod-like articles will fall down into an unshown container and will not be fed to the packing apparatus 1. In FIGS. 9 and 10, the drives of the transferring units 7, 7' were not shown. After conveying the groups G to the pockets 40 of the conveyor 6, the transport units 15 move further on the path 17, and their transport sections 13A, 13B are in the closed configuration. The transport sections 13A, 13B will be switched from the closed configuration to the open configuration after shifting by an opening unit 53 (FIG. 1) which is provided with an opening cam 54 which will force a rotation of the steering element 23, thus a movement of the transport section 13B. The action of the opening unit 53 is opposite to the action of the forming unit 25. The opening unit 53 may be situated both at the lower section of the path 17 as shown in FIG. 1 and at the upper section of the path 17 i.e. behind the transferring unit 7, 7' of before the feeding unit 4, 4'.

Each of the forming and transporting apparatuses 5, 5' is provided with sensors 50 to check the transported rod-like articles 3 transversely to the axis of these articles. The sensors 50 are adapted to receive the radiation passing through the rod-like articles 3 and are situated above the path 17; the not shown sources of radiation are situated beneath the path 17. Furthermore, the forming and transporting apparatus 5, 5' is provided with sensors 51, 52 to check the quality of tips of the rod-like articles 3. The sensors 51, 52 are situated on both sides of the path 17, 17'. If defective rod-like articles 3 in the groups G are detected, it is possible to reject such group as described above.

Figure 11:
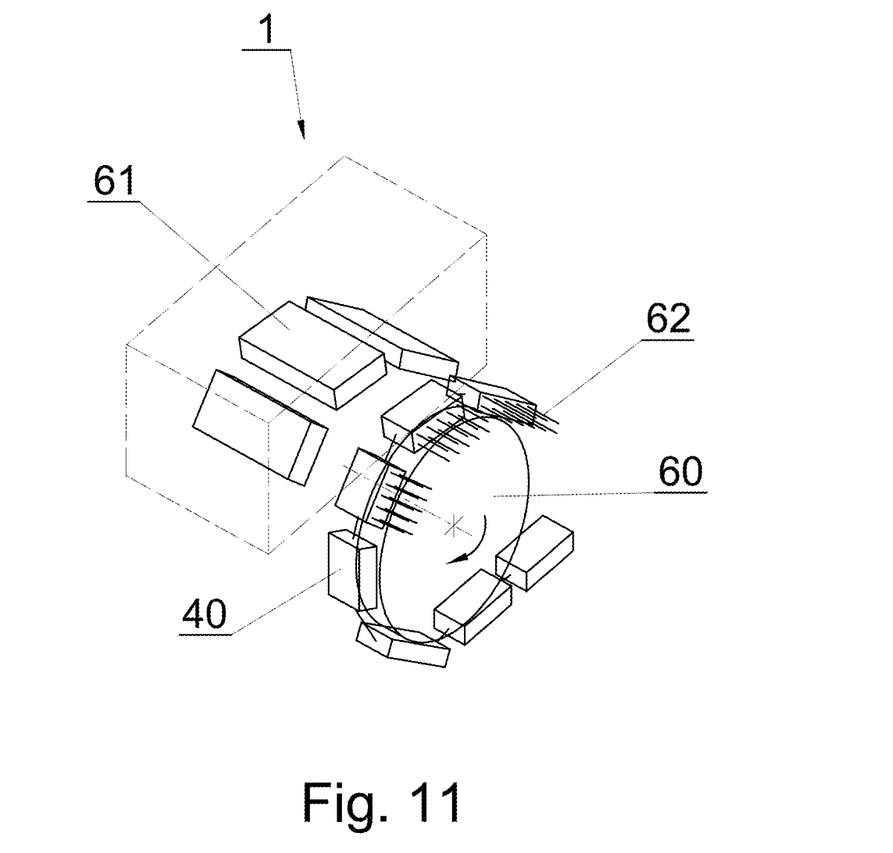

The transport pockets 40 of the conveyor 6 are moved to the packing apparatus 1. The transport pockets 40 are placed onto a transport wheel 60 (FIG. 11). The conveyor 6 and the transport wheel 60 make a rotational stroke movement. The transport wheel 60 stops when for example three filled transport pockets 40 are situated directly opposite the packing channels 61. The pushers 62 push the groups G of the rod-like articles 3 from the transport pockets 40 to the packing channels 61. After pushing the groups G of the rod-like articles 3, the transport wheel 60 makes a rotation by a determined angle so that the successive three filled transport pockets 40 will be situated directly opposite the packing channels 61.

The invention claimed is:

1. A forming and transporting apparatus (5) for conveying rod-like articles (3) and forming a group (G) of rod-like articles (3) of the tobacco industry, comprising transport units (15), whereas a transport unit (15) comprises a transport carriage (16) adapted to move along a path (17), and a transport tray (13) provided with a number of transport grooves (18) adapted to hold the rod-like articles (3), whereas such tray is fastened to the transport carriage (16), whereas the transport carriage (13) is divided into two transport sections (13A, 13B) which are adapted to change their reciprocal position between an open configuration in which the transport grooves (18) are situated substantially in one plane (k, k') and a closed configuration in which the transport grooves (18) are situated in two planes (k, k') being substantially parallel to each other, whereas the transport sections (13A, 13B) are rotatably connected with each other on the axis of rotation (20) corresponding to the direction (T) of movement of the transport carriage (16), characterised in that the first transport section (13A) is fastened to the transport carriage (16), and the second transport section (13B) is provided with a steering element (23), the forming and transporting apparatus (5) is provided with a forming unit (25) comprising a closing cam (24) situated next to the path (17), the closing cam (24) having a raceway (24C) adapted to guide the steering element (23) in such a way that while moving the transport unit (15) through the forming unit (25) the second transport section (13B) makes a rotation relative to the first transport section (13A) in order to change the configuration of the transport sections (13A, 13B) from the open configuration to the closed configuration, characterised in that the body (27) of the second tray (13B) is provided with at least one vacuum channel (28) being in fluid connection with vacuum openings (19) in the transport grooves (18) of the second transport section (13B), whereas the vacuum channel (28) is directed towards the cylindrical surface (31) provided with openings (30) which supply the vacuum during the movement of the transport unit (15) through the forming unit (25).

2. The apparatus as in claim 1 characterised in that the closing cam (24) has a cylindrical form.

3. The apparatus as in claim 1 characterised in that the steering element (23) is a rotating roller.

4. The apparatus as in claim 1 characterised in that the cylindrical surface (31) is a stationary surface.

5. The apparatus as in claim 1 characterised by being provided with an opening unit (53) comprising an opening cam (54) situated next to the path (17), the opening cam (54) having a channel adapted to guide the steering element (23) in such a way that while moving the transport unit (15) through the opening unit (53) the second transport section (13B) makes a rotation relative to the first transport section (13A) in order to change the configuration of the transport sections (13A, 13B) from the closed configuration to the open configuration.

6. The apparatus as in claim 1 characterised in that the transport units (15) are adapted to move along the path (17) independently of one another.

7. A feeding apparatus for feeding a group (G) of rod-like articles comprising at least one feeding unit (4) for feeding the rod-like articles (3D) provided with a drum conveyor (12); at least one forming and transporting apparatus (15) for receiving the rod-like articles (3) from the drum conveyor (11), conveying the rod-like articles (3) and forming the groups (G) of the rod-like articles (3); a conveyor (6) of groups of the rod-like articles (3) for receiving the groups (G) of the rod-like articles from the forming and transporting apparatus (5) and feeding the groups (G) to a receiving apparatus; a transferring unit (7) for transferring the groups (G) of the rod-like articles (3) from the transport units (15) to the pockets (40) of the conveyor (6) of the groups of rod-like articles, characterised in that the feeding apparatus is provided with the forming and transporting apparatus described in claim 1.

* * * * *